US008620900B2

(12) United States Patent
Luk

(10) Patent No.: US 8,620,900 B2
(45) Date of Patent: Dec. 31, 2013

(54) METHOD FOR USING DUAL INDICES TO SUPPORT QUERY EXPANSION, RELEVANCE/NON-RELEVANCE MODELS, BLIND/RELEVANCE FEEDBACK AND AN INTELLIGENT SEARCH INTERFACE

(75) Inventor: Robert Wing Pong Luk, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 280 days.

(21) Appl. No.: 12/368,282

(22) Filed: Feb. 9, 2009

(65) Prior Publication Data

US 2010/0205172 A1  Aug. 12, 2010

(51) Int. Cl.
*G06F 17/30* (2006.01)

(52) U.S. Cl.
USPC .......................................................... 707/715

(58) Field of Classification Search
None
See application file for complete search history.

(56) References Cited

U.S. PATENT DOCUMENTS

| | | | |
|---|---|---|---|
| 6,131,082 A * | 10/2000 | Hargrave et al. ................... | 704/7 |
| 6,615,209 B1 | 9/2003 | Gomes et al. | |
| 6,976,025 B2 | 12/2005 | Luk et al. | |
| 7,328,204 B2 | 2/2008 | Coady | |
| 7,801,898 B1 * | 9/2010 | Weissman ..................... | 707/742 |
| 2003/0191737 A1 | 10/2003 | Steele et al. | |
| 2006/0117002 A1 | 6/2006 | Swen | |
| 2007/0288436 A1 | 12/2007 | Cao | |
| 2008/0077570 A1 * | 3/2008 | Tang et al. ......................... | 707/5 |
| 2009/0125498 A1 * | 5/2009 | Cao et al. .......................... | 707/5 |

OTHER PUBLICATIONS

Luk, "Compact Morphic Directed Acyclic Word Graphs", The Computer Journal, 2001, vol. 44, No. 5, pp. 425-434.
Luk et al., "Document ranking for variable bit-block compression signatures", Information Processing and Management, 2001, vol. 37, pp. 39-51.
Brin et al., "The anatomy of a large-scale hypertextual Web search engine", Computer Networks and ISDN Systems, 1998, vol. 30, pp. 107-117.
Luk et al., "Bilingual legal document retrieval and management using XML", Software—Practice and Experience, 2003, vol. 33, pp. 41-59.
Wu et al., "Probabilistic Document-Context Based Relevance Feedback with Limited Relevance Judgments", Proceedings of ACM CIKM 06, 2006, pp. 854-855.

(Continued)

*Primary Examiner* — Bai D. Vu
(74) *Attorney, Agent, or Firm* — KPPB LLP

(57) ABSTRACT

A method for using dual indices to support query expansion, relevance/non-relevance models, blind/relevance feedback and an intelligent search interface, comprising using a computing device to: access an inverted index to obtain an initial retrieval of results in response to a query, and to generate a rank list of the results, the results referring to information units (IUs) where the query occurs; and determine a number of "N" IUs in the results that are regarded by the computing device to be relevant by accessing a forward index; and use the forward index to perform any one from the group consisting of: computing query expansion weights for top "N" retrieved IUs, building the relevance models by the contexts of query terms in the top "N" retrieved IUs, and finding the longest contiguous sequences of query terms in a query found in an IU; wherein the forward index and inverted index have pointers to locations in the IUs where terms of the query occur, and the forward index retrieves a term frequency vector of the IU or a set of contexts of the IU.

13 Claims, 10 Drawing Sheets

(56) References Cited

OTHER PUBLICATIONS

Wong et al., "Re-examining the effects of adding relevance information in a relevance feedback environment", Information-Processing and Management, 2008, vol. 44, pp. 1086-1116.

Luk et al., "Efficient in-memory extensible inverted file", Information Systems, 2007, vol. 32, pp. 733-754.

Mccreight, "A Space-Economical Suffix Tree Construction Algorithm", Journal of the Association for Computing Machinery, Apr. 1976, vol. 23, No. 2, pp. 262-272.

Bezo-Yates et al., "Modern Information Retrieval", Addison-Wesley, 1999, p. 118.

* cited by examiner

METHOD FOR USING DUAL INDICES TO SUPPORT QUERY EXPANSION, RELEVANCE/NON-RELEVANCE MODELS, BLIND/RELEVANCE FEEDBACK AND AN INTELLIGENT SEARCH INTERFACE

TECHNICAL FIELD

The invention concerns a method and system for using dual indices to support query expansion, relevance/non-relevance models, blind/relevance feedback and an intelligent search interface.

BACKGROUND OF THE INVENTION

Many techniques are used to help Internet users locate desired information. Some techniques organize content based on a hierarchy of categories. A user may then navigate through a series of hierarchical menus to find desired content. Search engines on the Internet are tools to locate relevant content. Through a search engine, in response to a user's query, a rank ordered list and hypertext links are returned.

The goal of search engine implementation is to optimize the speed of the query, that is, find the documents where a particular word occurs. One implementation is to create a forward index which stores list of words in a document. The forward index is inverted to create an inverted index. The inverted index data structure is created which lists the documents per word instead of listing the words per document as in the forward index.

After the inverted index is created, the query can now be resolved by jumping to the word identifier (via random access) in the inverted index. Random access is generally regarded as being faster than sequential access.

It is desirable to provide an improved search engine resulting in more accurate searches and results.

SUMMARY OF THE INVENTION

In a first preferred aspect, there is provided a method for using dual indices to support query expansion, relevance/non-relevance models, blind/relevance feedback and an intelligent search interface, the method involves accessing an inverted index to obtain an initial retrieval of results in response to a query, and to generate a rank list of the results, the results referring to information units (IUs) where terms of the query occur. The method also involves determining a number of "N" IUs in the results that are assumed to be relevant by accessing a forward index. The forward index and inverted index have pointers to locations in the IUs where terms of the query occur more than once, and a forward index and inverted index pointer storage stores the locations in the IUs where the query term occurs only once in the IUs, and the forward index retrieves a term frequency vector of the IU or a set of contexts of the IU.

"N" may be from 1 to 10000 or is query-dependent.

If "N" is query-dependent, the forward index may be accessed one-by-one to determine the number "N".

The forward index may be searched by an information unit identifier (IID) of the IU, and is searched by terms of the query, and the frequencies of the query terms are collected.

The forward index may be a set of frequency vectors for the IUs.

The inverted index and forward index may be compressed. The locations may be cached in a cache that becomes a file. The cache, inverted index and forward index may be stored on solid state disk drives.

The forward index may be any one from the group consisting of: variable bit-block compression signature, superimposed coding signature, vocabulary index, trie, B-tree, heap B-tree, red-black tree, suffix arrays, suffix tree, PATRICIA trie, string B-tree, and DAWGs.

The method may further involve the initial steps of: storing the frequencies of the query terms in the forward index; and storing the pointers to word locations in the forward index.

In a second aspect, there is provided a system for supporting query expansion, relevance/non-relevance models, blind/relevance feedback and an intelligent search interface using dual indices. The system has a retrieval module to access an inverted index to obtain an initial retrieval of results in response to a query, and to generate a rank list of the results, the results referring to information units (IUs) where the query occurs. The system also has a post-processing module to determine a number of "N" IUs in the results that are assumed to be relevant by accessing a forward index. The forward index and inverted index have pointers to locations in the IUs where terms of the query occur more than once, and a forward index and inverted index pointer storage stores the locations in the IUs where the query term occurs only once in the IUs, and the forward index retrieves a term frequency vector of the IU or a set of contexts of the IU.

The system may further comprise solid state disk drives to store the inverted index and forward index.

In a third aspect, there is provided a search engine providing support for query expansion, relevance/non-relevance models, blind/relevance feedback and an intelligent search interface. The search engine has dual indices consisting of an inverted index and a forward index. The search engine also has a retrieval module to access an inverted index to obtain an initial retrieval of results in response to a query, and to generate a rank list of the results, the results referring to information units (IUs) where the query occurs. The search engine yet also has a post-processing module to determine a number of "N" IUs in the results that are assumed to be relevant by accessing a forward index. The forward index and inverted index have pointers to locations in the IUs where terms of the query occur more than once, and a forward index and inverted index pointer storage stores the locations in the IUs where the query term occurs only once in the IUs, and the forward index retrieves a term frequency vector of the IU or a set of contexts of the IU.

The present invention uses two different types of indices, an inverted index and a forward index, to support fast query expansion and fast document re-ranking to support relevance feedback, including blind feedback, and selection of concept/category information for intelligent search interface construction. In comparison to the prior art, the present invention enables interaction between the inverted index and forward index for relevance feedback, including blind feedback, and concept/category statistics computation.

BRIEF DESCRIPTION OF THE DRAWINGS

An example of the invention will now be described with reference to the accompanying drawings, in which.

DETAILED DESCRIPTION OF THE DRAWINGS

The drawings and the following discussion are intended to provide a brief, general description of a suitable computing environment in which the present invention may be implemented. Although not required, the invention will be described in the general context of computer-executable instructions, such as program modules, being executed by a computer such as a personal computer, laptop computer, notebook computer, tablet computer, PDA and the like. Generally, program modules include routines, programs, characters, components, data structures, that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
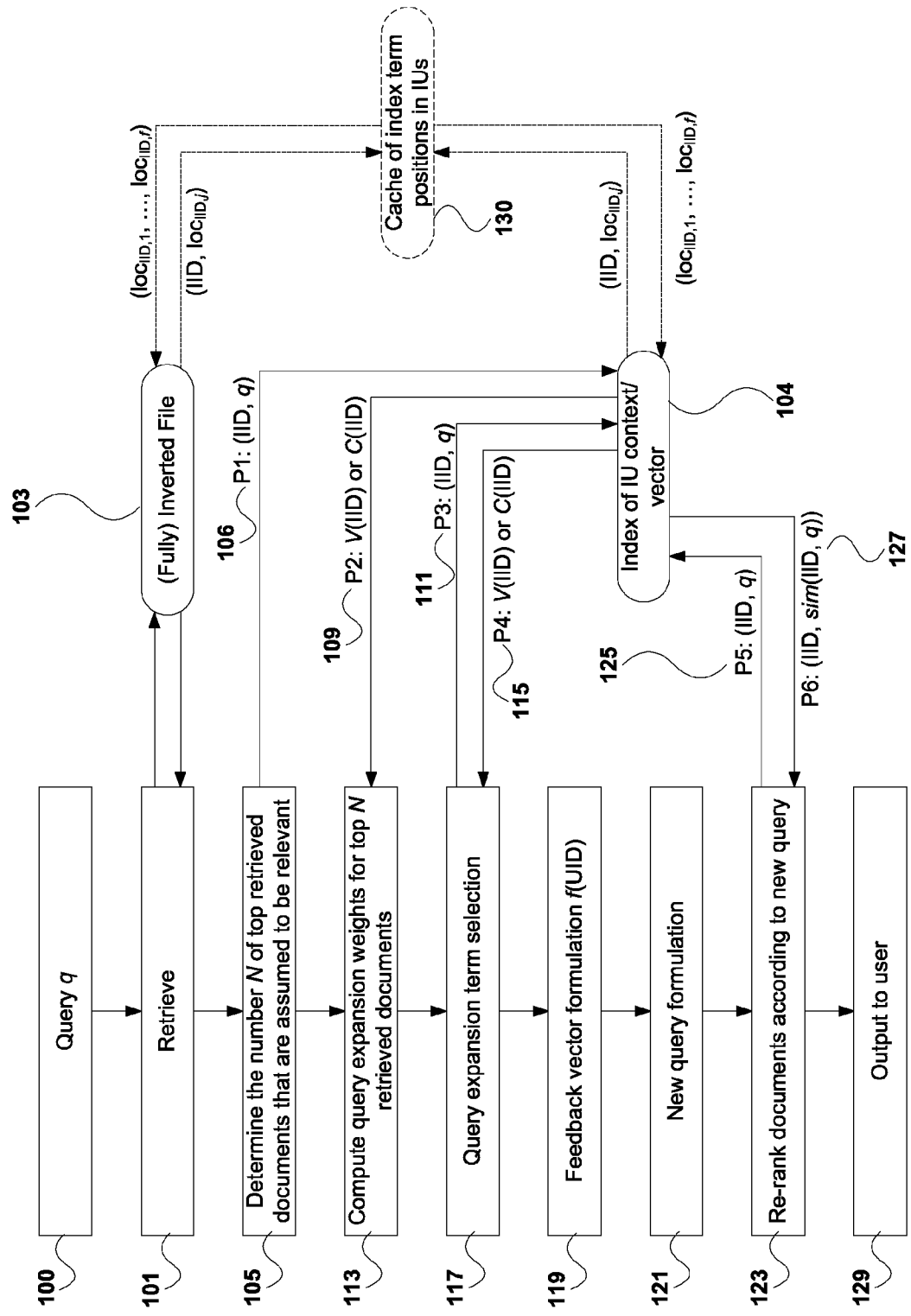
FIG. 1 is a process flow diagram of query expansion by blind feedback using a dual indices structure.
Figure 10:
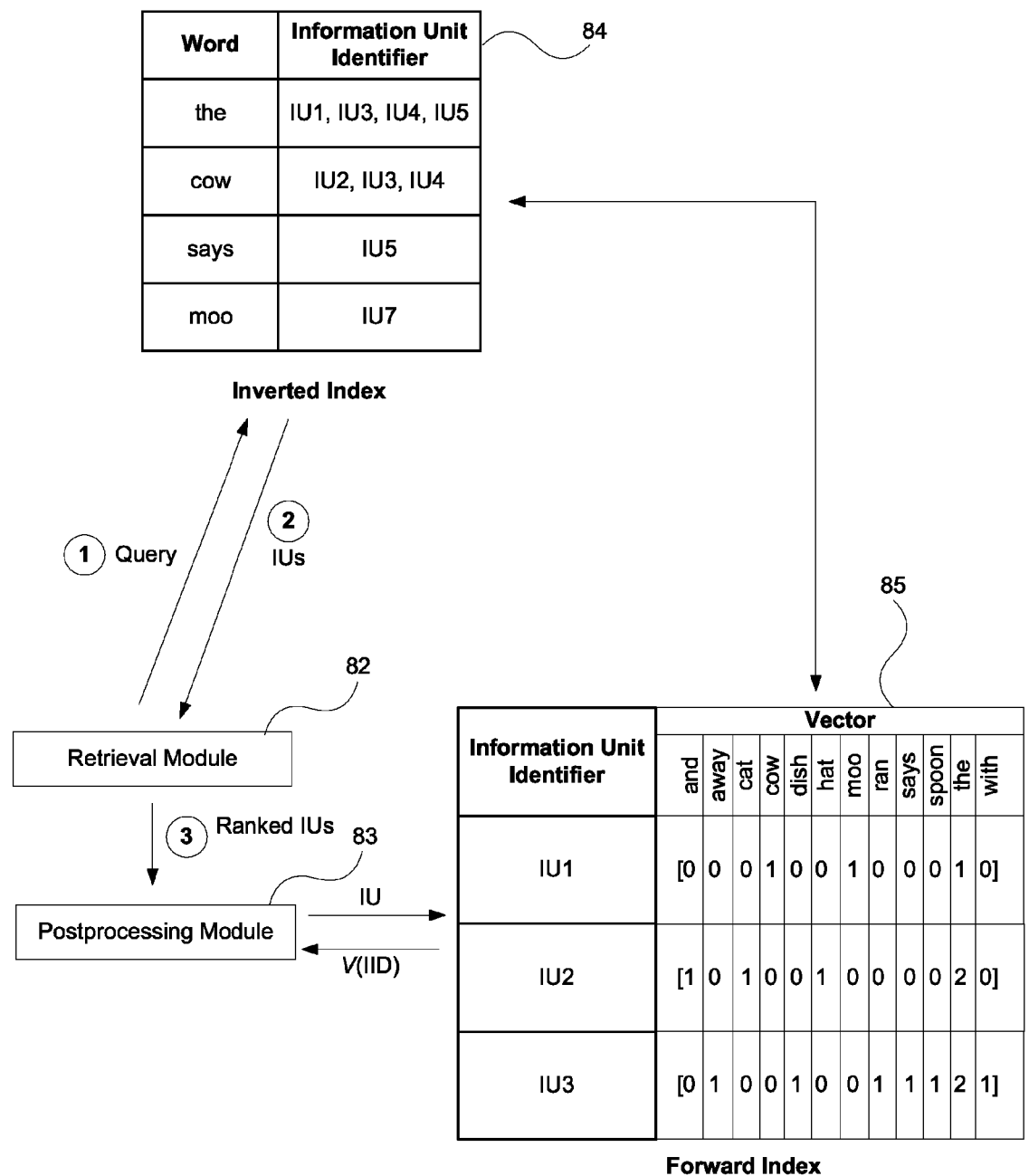
FIG. 10 is a conceptual diagram of the interaction of dual indices according to processes of FIGS. 1 and 3.

Referring to FIGS. 1 and 10, information units (IUs) are objects where indexing terms are extracted and indexed. An IU may be a document, a fixed length passage, a passage that may obey layout/linguistic boundaries, for example, paragraph or sentence boundaries), and a passage may overlap with other adjacent passages of a document. An IU may be a document-context of fixed or varying length. For a varying length IU, the context may terminate at layout/linguistic boundaries, for example, a paragraph or sentence. A method for searching using dual indices of a first embodiment is provided. A query 100 is input by a user, typically via an internet search engine. The initial retrieval 101 of results is generated by accessing an inverted file 103. The retrieval module 82 performs the initial retrieval 101. Next, the top "N" IUs are determined and assumed to be relevant 105, where "N" is from 1 to 10,000, or is query-dependent. The postprocessing module 83 determines the relevancy 105.

If "N" is query-dependent, determining 105 the number "N" requires accessing a forward index 104 of the top "N" retrieved IUs one-by-one 107. Each IU is referenced by an information unit identifier (IID).

A forward index 104 may be signatures (suffix-tree based index, vocabulary-based index or trie). The signature-based index and the suffix-based index are typically implemented on a cluster of computers so that these indices can be processed in a parallel manner. Preferably, these indices are stored in Flash/solid state disk drive(s) 88 for fast read access. Read access speeds may be 45 µs (microsecond) latency in contrast to 7 ms (millisecond) latency for ready only disk access for a performance hard disk drive or 12 ms latency for disk access of a capacity hard disk drive. Similarly, the fully inverted index 103 is stored in solid state disk drive(s) 88 when it is compressed and not loaded into Random Access Memory (RAM). When both these indices 103, 104 are stored in solid state disk drive(s) 88, the RAM in the computing nodes 89 is used as a cache of the accessed portion of the indices 103, 104.

Two types of structure for a forward index 104 are possible. The forward index 104 may be a variable bit-block compression signature or superimposed coding signature. This type of forward index 104 is a compression of the term frequency vector V(IID). Others include using a vocabulary index such as a trie, B-tree, heap B-tree, red-black tree, or Directed Acyclic Word Graphs (DAWGs). This type of forward index 104 retrieves the term frequency vector V(IID).

The second type of forward index 104 supports retrieval of a set C(IID) of contexts of the IU referenced by its IID. For each top N IU, the left and right contexts of a query term in q are obtained by the logical position of the occurrences of the query term. This type of forward index 104 retrieves the set C(IID) of contexts of the IU.

There are five approaches to support retrieval of a set C(IID) of contexts. The approach selected is dependent on a time-space efficiency trade-off.

The first approach is storage efficient. The logical positions are stored in a suffix array. A binary search finds all the locations where the query term occurs in the IU. Based on these locations, the contexts are obtained by terms on the left and on the right of those locations. Each suffix array is built for each IU. Thus, interface module 81 needs to supply the IID to the forward index 104 which contains a set of suffic array accessibly by IID. Using the corresponding suffix array to IID, the contexts are extracted and returned as C(IID). The advantage of using a suffix array in this manner is to save the time to load the dictionary into RAM memory which is linear with respect to the vocabulary size of the IU. For suffix array, the vocabulary size is obtained and the binary search may start immediately. Also, the suffix array does not need to store the string keys which reside in the IU. This is storage efficient when the index terms are n-grams (i.e., sequences of n terms). The additional storage A is of |IID|1 cp where |IID|1 is the city-block distance of the IU referenced by IID and cp is the storage cost of a pointer to a location in the IU.

The second approach is for faster access time. The forward index 104 trades-off storage with speed. A vocabulary-index approach is used, especially when it is not necessary to decode the term frequency of every term in the IU. An example vocabulary index of a single IU is a trie. This trie is built for each IU, and it (for example, represented as a spstring (10) may be stored on (the solid state) disk 88. When the query term is matched with the trie index, the set of query term occurrence locations in the IU is found. Subsequently, the contexts are collected using those locations. In this case, the extra storage is A+vc(IID) where vc(IID) is the storage cost of the vocabulary index for the IU referenced by IID.

The third approach eliminates the vocabulary index storage cost without sacrificing the access speed. All the locations of the term occurrences are stored in the fully inverted file 103 where a posting of a term j for IID is a variable length record of the form (IID, f, loc1, loc2, . . . , locf). This record contains the IU identifier (IID), the occurrence frequency f of the index term in the IU, and f locations (integers). The record may be compressed by a standard inverted file compression technique. However, this approach incurs more storage costs for each posting in the inverted index 103 than the second approach.

The fourth approach stores the first location of the query term in the inverted file 103. Each extended posting in the inverted file 103 of term j is a triple (IID, fIID,j,locIID,j) where IID is the identifier of the IU unit that contains the index term j, fIID,j is the term frequency or occurrence frequency of term j in IID, and locIID,j is the first occurrence of index term j in information unit IID. However, the inverted file 103 needs to store an additional location which may be compressed by standard inverted file compression techniques in order to reduce costs. For this approach, all the other fIID,j−1 locations of the query term occurrences are stored after the first occurrence of the query term. Since the occurrence frequencies fIID,j are stored in the posting, the number of occurrence locations to be read is known, and there is no need to store this information in the IU. According to Zipf law, half the number of terms has only one occurrence, so roughly half the terms does not need to add any location information after the first occurrence of such terms. To compute the other locations of query term occurrences, the IU needs to be preprocessed by finding the other occurrences of the index term apart from the first occurrence, computing the relative positions to skip in order to obtain the location offset to find the next occurrence of the term in the IU, adding these offsets after the first occurrence of the index term in the IU. Because the IU data has been tempered, the extraction of the left context information needs to take this into account.

The fifth approach is similar to the fourth approach using the extended posting, except when the index term j occurs more than once in the IU, locIID,j is the first location of a location file 130 that stores the location of index term occurrences. Each IU has a location file. This location file 130 stores the locations of the index terms where locations of the same index terms are packed together in ascending order of locations. Although this approach wastes one additional location compared with the previous approach when fIID,j>1, the IU data is not tempered with, and the left contexts of a query term may be extracted without additional processing as needed by the previous approach. In practice, the location files 130 are aggregated and accessed by adding a relative offset determined by the IID of IU. Also the location file (D0) data may be shared with the other index 103 which stores extended postings.

The first index is a fully inverted index 103 for fast retrieval. This index 103 retrieves an IU that may or may not be the same type of IUs that are indexed and stored in the second index. If the IU of the first index 103 differs from the IUs of the second index, then an algorithm maps the IUs of the first index 103 to the IUs of the second index using a dictionary management data structure, like red-black trees or hashing or tries or spstrings. For example, the IUs of the first index 103 may be documents and the IUs of the second index may be fixed length passages inside the documents. In this case, a single document IU of the first index maps to a set of passages IU indexed by the second index. Another example is that IUs of both the first and second indices are passages of the same fixed length. In this case, a passage IU of the first index maps to the same passage IU of the second index. This process may execute prior to P1 or after P1.

To identify a specific forward index 104 for determining 105 the number "N" of top retrieved IUs, either the V(IID) or C(IID) is retrieved 106 using the IID of the IU. V(IID) or C(IID) is returned 109 from the forward index 104. A determination is then made to stop assuming the top "N" IU is relevant by examining the statistics of the query term frequencies of the top "N" retrieved IUs.

The query expansion term weight of each top "N" retrieved IU is calculated 113 by accessing 111 the forward index 104 of the IU. The forward index 104 is accessed by the IIDs stored in the rank list of the initial retrieval 101. When the signatures are processed, a vector V(IID) of term frequencies for the corresponding IU of that signature is added 115 to current total term frequencies of every term in the signature. The presence of terms in the vector V(IID) is used to update the document frequency, $df_{N_q}$ of these terms in set of top "N" retrieved IUs.

Statistics are collected using vector V(IID). Query expansion terms are selected 117 by ranking terms using a combination of the acquired statistics. After the query expansion terms are selected, a new feedback vector f(UID)) is formed 119 by normalizing the weight of the query expansion terms.

After normalizing the weight of the initial query vector, the normalized query vector is combined with the normalized feedback vector to form 121 a new query vector by linear interpolation. This new query vector is used to compute a new similarity score of each top "N" retrieved IU.

These IUs are re-ranked 123 by the new similarity score. The re-ranked IUs P5: (IID, q) are sent 125 to the forward index 104 and P6: (IID, sim(IID, q)) delivered 127 from the forward index 104. The re-ranked IUs are presented 129 to the user who is aware of the initial retrieval 101.

Figure 2:
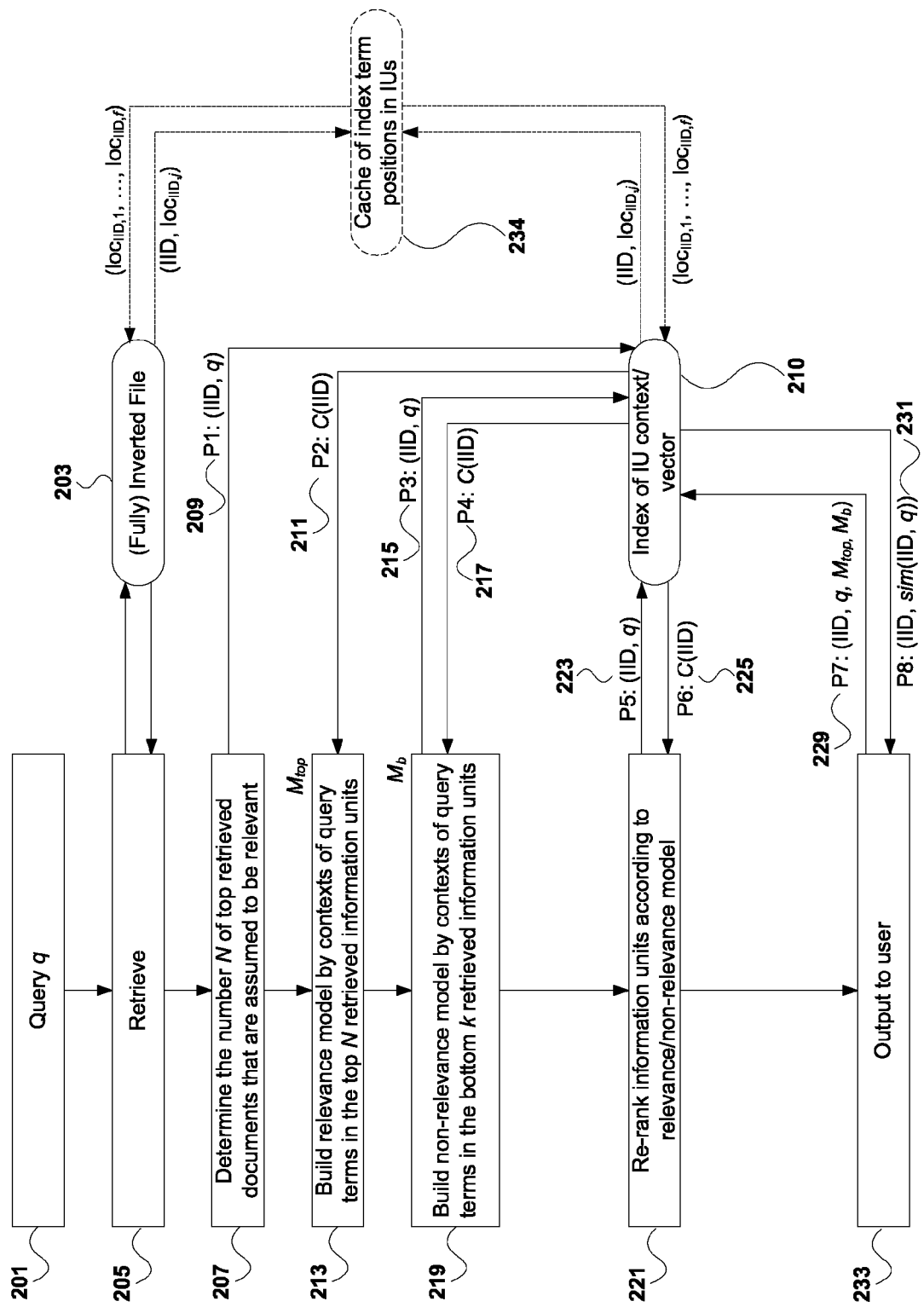
FIG. 2 is a process flow diagram of document context-based retrieval by blind feedback using a dual indices structure.
Figure 9:
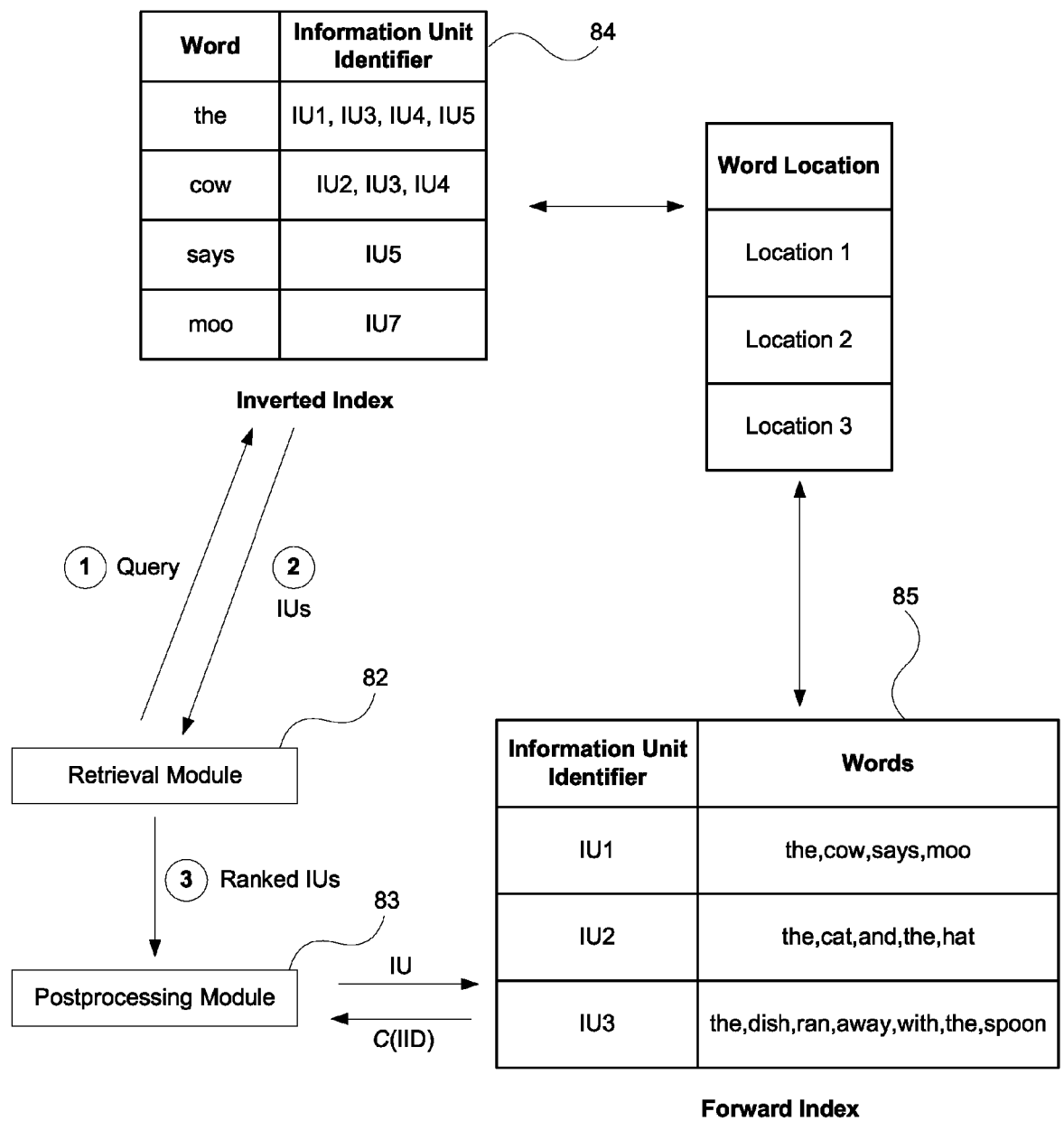
FIG. 9 is a conceptual diagram of the interaction of dual indices according to processes of FIGS. 2 and 4.

Referring to FIGS. 2 and 9, a method for searching using dual indices of a second embodiment is provided. In this embodiment, after the input of a query 201 by a user via an internet search engine, the initial retrieval 205 of results is generated by accessing an inverted file 203. The retrieval module 82 performs the initial retrieval 205. To determine 207 how large "N" is, from 1 to 1000, a forward index 210 containing contexts of IUs is accessed. A relevance model is built 213 by the contexts of query terms in the top "N" retrieved IUs, for example, the top ten retrieved IUs. The postprocessing module 83 builds the relevance model. The relevance model is aided by accessing 215 the forward index 210 of IUs and delivering 217 information from the forward index 210.

A partial non-relevance model is built using bottom k IUs. This is performed by passing 223 information to the forward index 210, and delivering 225 information from the forward index 210 to build 219 the non-relevance model. The IUs are then re-ranked 221 according to the relevance and non-relevance models. This occurs also by passing 229 information to the forward index 210 and delivering 231 information from the forward index 210. The re-ranked information is then output 233 to the user.

Figure 3:
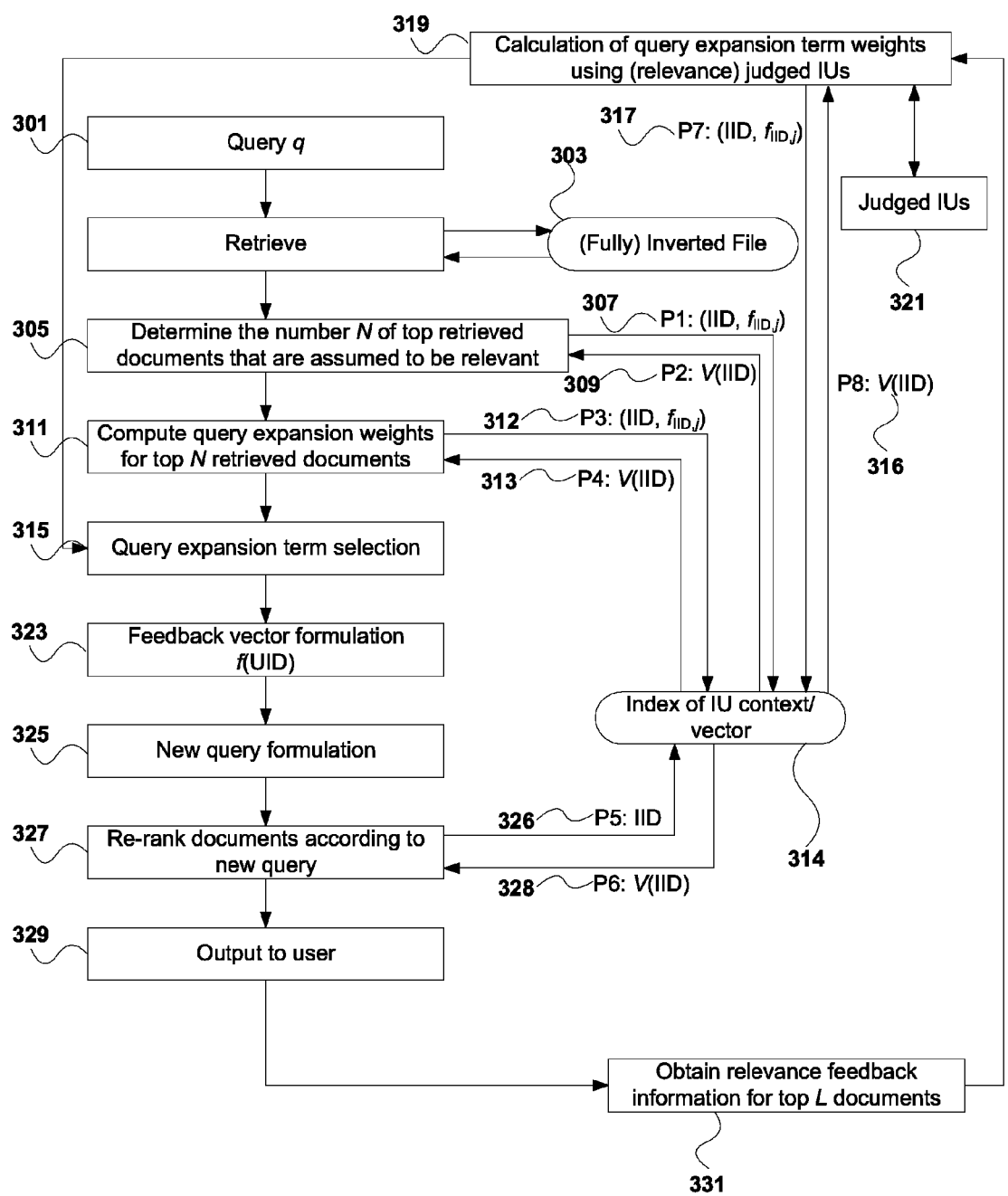
FIG. 3 is a process flow diagram of query expansion by relevance feedback using a dual indices structure.

Referring to FIGS. 3 and 10, a method for searching using dual indices of a third embodiment is provided. Similar to previous embodiments, after a query is input 301, initial retrieval of results is obtained by accessing 302 the inverted file 303. The number "N" of top retrieved IUs is determined 305. The query expansion weights for top "N" retrieved IUs are computed 311. The query expansion term is selected 315. The feedback vector f(UID) is formulated 323. A new query is formulated 325. IUs are re-ranked 327. This all occurs while accessing 307, 309, 312, 313, 326, 328 the forward index 314 of an IU.

In this embodiment, however, the search result is presented 329 to the user. The user indicates the relevance, or by default, the non-relevance of the presented information units. After the user makes their indication this extracts 331 the relevance judgment information 321 of the top L IUs. The set of relevant IUs and the set of non-relevant IUs are passed 317 to the forward index 314. The forward index 314 is accessed to compute 311 the query expansion term weights. The relevance of each IU is known. Two sets of query expansion term weights are computed. One set is for the set of relevant IUs and the other set is for the set of non-relevant IUs. Two query expansion terms weighted are kept if the query expansion term appears in both relevant and non-relevant IUs. These query expansion term weights and their corresponding query expansion terms are used for query expansion term selection 315. In contrast to blind feedback, the expansion term selection is carried out twice: one for query expansion terms derived from the relevant IUs and another one for terms derived from the non-relevant IUs.

The feedback vector f(UID) is formed 323 by interpolating the positive and negative vectors. The positive feedback f' vector is composed of the selected expansion terms and their weights from the relevant information units and the negative feedback vector f is composed of the selected expansion terms and their weights from the non-relevant IUs. For some relevance feedback, there is no negative feedback vector, so the interpolation parameter may be set to one so that all expansion term weights in f are multiplied by zero.

Formulating a new query q' by linear interpolation 325 occurs by:

$$q' := \alpha q + (1-\alpha) \cdot (\beta f^+ - (1-\beta) \cdot f)$$

where $\alpha$ is the interpolation parameter between the query and the overall feedback vector. The vectors can be assumed to be appropriately normalized.

To re-rank 327 IUs, use of q' occurs in a way similar to query expansion for blind feedback. For some relevance feedback methods, the document-contexts of query terms need to be accessed as well as the term frequency of expansion terms in q'.

Figure 4:
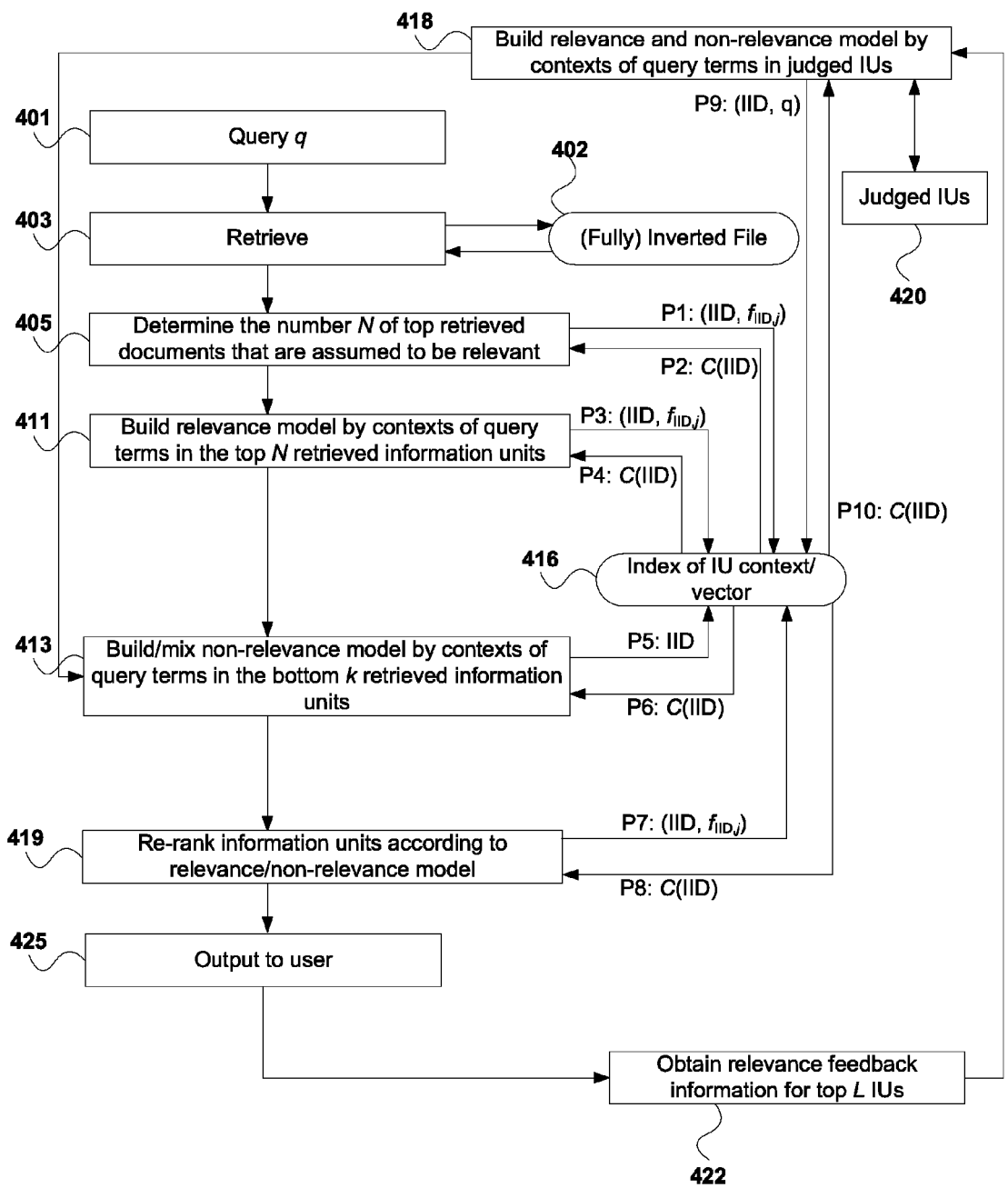
FIG. 4 is a process flow diagram of document-context re-ranking by relevance feedback using a dual indices structure.

Referring to FIGS. 4 and 9, a method for searching using dual indices of a fourth embodiment is provided. The processing is almost the same as the previous embodiment, including query input 401, retrieval 403, determining the number N of top retrieved IUs that are assumed to be relevant 405, building reference model 411, building non-reference model 413, re-ranking information 419, and outputting to user 425. The process occurs via an inverted index 402 and a forward index 416. However, in this embodiment, the reference model and the non-relevance model are built 418 using document-contexts of query terms in the judged IUs. Judged IUs for the modified queries are stored 420. As the user iterates through more relevance feedback cycles for the same topic, the judged IUs are stored 420. In addition to building 418 the relevance and non-relevance model, the background model is also built 413 by assuming that the bottom k information units are non-relevant. The non-relevance model and the background model are combined to form a single non-relevance model by, for example, interpolation.

Figure 5:
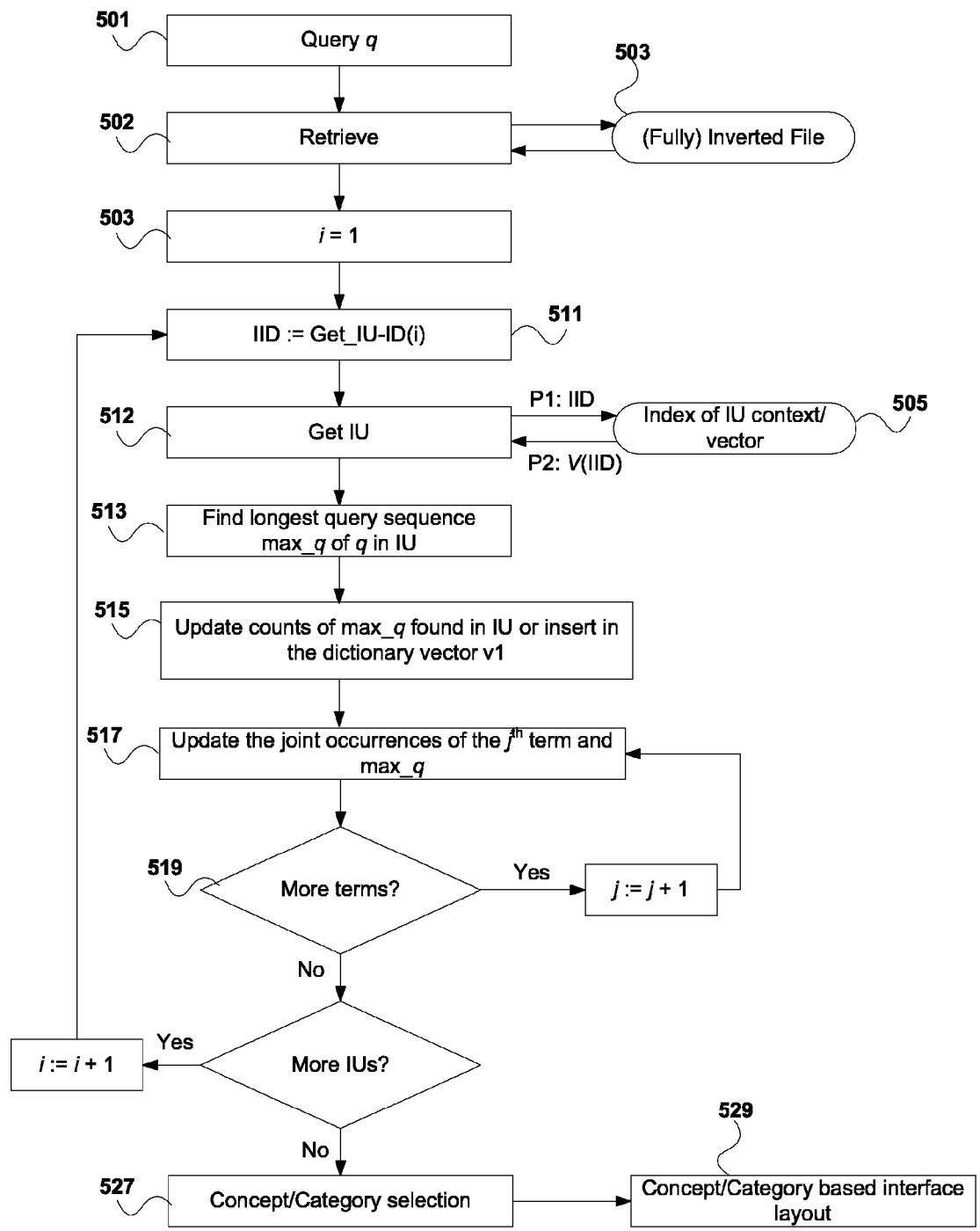
FIG. 5 is a process flow diagram of statistics computation to support a concept-based interface.

Referring to FIG. 5, dual indices 503, 505 are obtained from IUs where the forward index 505 is a signature or vocabulary index. In this embodiment, the statistics together for each concept/category includes its total occurrence frequency and the document or information unit frequency in the top N retrieved IUs, where N is from 1 to 1000. These statistics are obtained by updating 515 a dictionary vector v1. To associate the statistics with the query 501, the joint occurrence counts of the largest query subsequences, $\{q_{max}\}$, found in the IU and the different concepts/categories found in the top N information units are updated 517 where $q_{max}$'s are the longest contiguous sequences of query terms in q found in the IU. The total occurrence frequencies are used to select 527 concepts/categories for display. A directed acyclic graph (DAG) may be created 529 where a node in this graph represents a concept/category. The existence of an edge indicates that the linked concepts/categories have strong association/point-wise mutual information which is derived from the joint occurrences of concepts/categories. The direction of the edge points from the concept/categories with a higher document frequency in the top N retrieved IUs to a lower document frequency in the top N retrieved IUs. The concepts/categories may be selected 527 using a greedy approximation that finds the largest coverage. Alternatively, they may be selected by their in-degrees. For the most general concepts/categories, they appear as leaf nodes of the DAG. If general concepts/categories need to be presented, then the best M leave nodes are selected for display.

Figure 6:
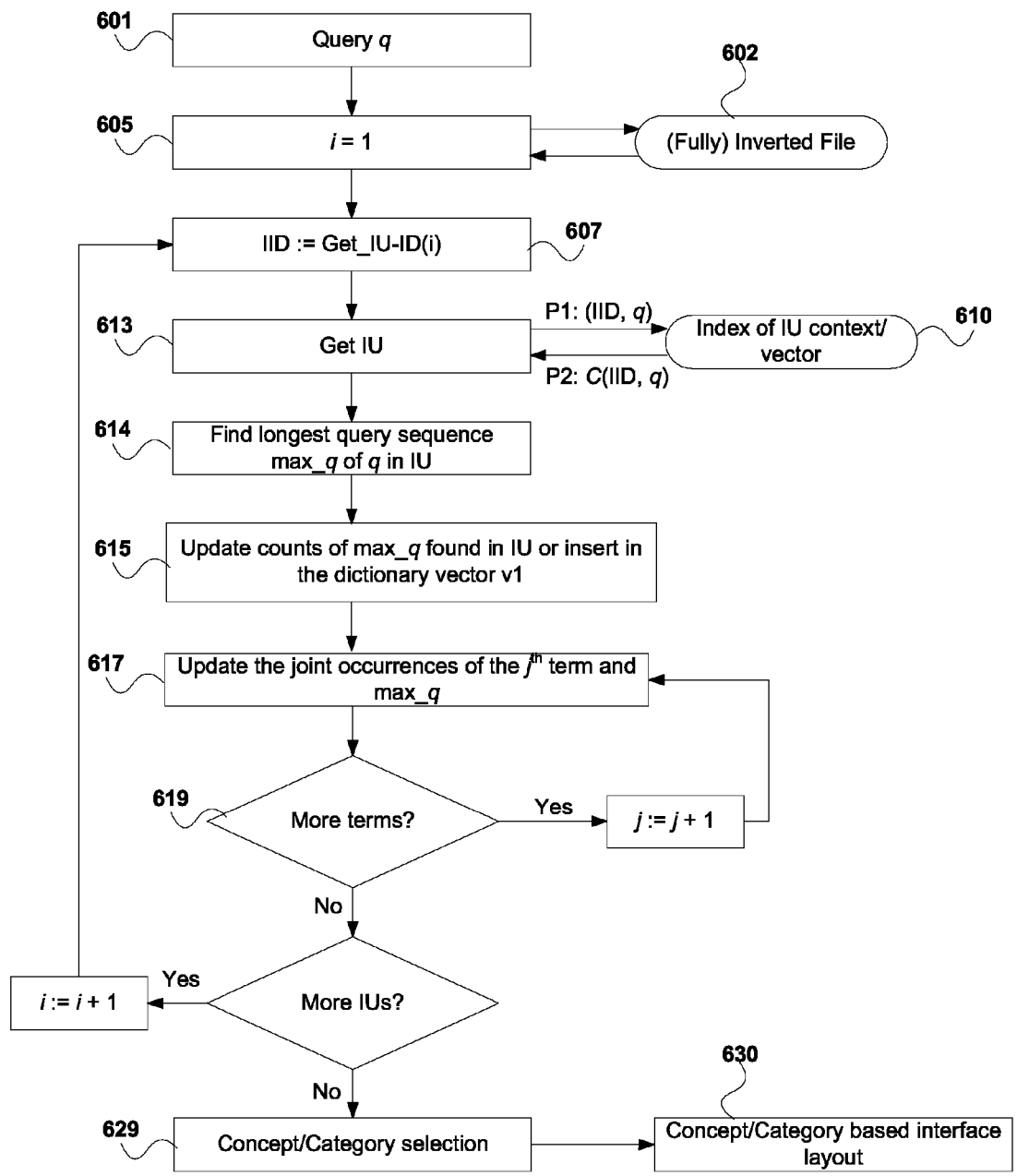
FIG. 6 is a process flow diagram of statistics computation to support a concept-based interface using information in contexts where query terms occur.

Referring to FIG. 6, instead of counting based on IUs and extracting concepts from the IUs, counting and concept extraction may be done based on IU contexts of query term occurrences. This means that getting 613 an IU also possesses the query together with the IID so that the contexts of the occurrences of query terms may be identified. Concept and category selection 629 may return the total occurrence frequencies, information unit frequencies, the joint occurrence frequencies of concepts and queries in the same information units, and the joint Occurrence frequencies of concepts and queries in the same contexts to select concepts/categories for display.

The index of an IU is implemented by a cluster-based indexing module called the forward index cluster 610. The collection of IUs are partitioned into subsets and kept by a cluster of servers. The IID is routed to a particular server in the cluster. This server uses the IID to find the IID's forward index, for example its signature, vocabulary-index, etc. If the approach to create a forward index is with positions, the position information is cached with the inverted file 602 and is accessed prior to accessing 602 the forward index 610. Thus, the inverted file 602 may communicate with the forward index 601 to access the position information even before the forward index 610 is queried 607 with the IID by i:=1 605.

Instructions are sent 605, 607 to different servers of the forward index cluster 610 according to the IID values and collect their information. This is a master-slave configuration.

IIDs may distribute top IUs to the different servers of the index of the IU. Optionally, the query is also passed to these servers by passing to index of an IU so that they may directly compute similarity scores for the given IIDs. These similarity scores are returned as tuples of the form (IID, sim(IID,q)) where sim(IID, q) is the similarity between IID and q.

For relevance feedback, parallel processing for calculation of query expansion term weights using judged IUs is similar to those for computing query expansion weights for top N retrieved IUs. In this case, the IID and the query may be passed to the index of an IU.

Parallel processing for determining the number N of top retrieved IUs assumed to be relevant and computing 311 query expansion weights for top N retrieval IUs involves distributing the tuples {(IID,q)} to the servers at index of information unit. The servers are identified by IID since they store the forward index of the specific IID. The partial background model is built using the available information in the forward index 314 by these servers. If more than one IU is stored in the same server, the quantities (for example, occurrence counts of terms in contexts) of the corresponding partial background models are aggregated by the same server, and these aggregated quantities are passed back to build/mix non-relevance model by contexts of query terms in the bottom k retrieved information units via C(IID). Next, the build/mix non-relevance model further aggregates the quantities of the returned partial background model into the final quantities for the background model. Similar parallel processing is done for reference model by build relevance model, and both relevance and non-relevance models. Note that the quantities aggregated or calculated in the servers of index of information unit are stored in a cache, until the relevance feedback process terminates. In this termination case, the memory occupied by these quantities is freed by each server.

Figure 7:
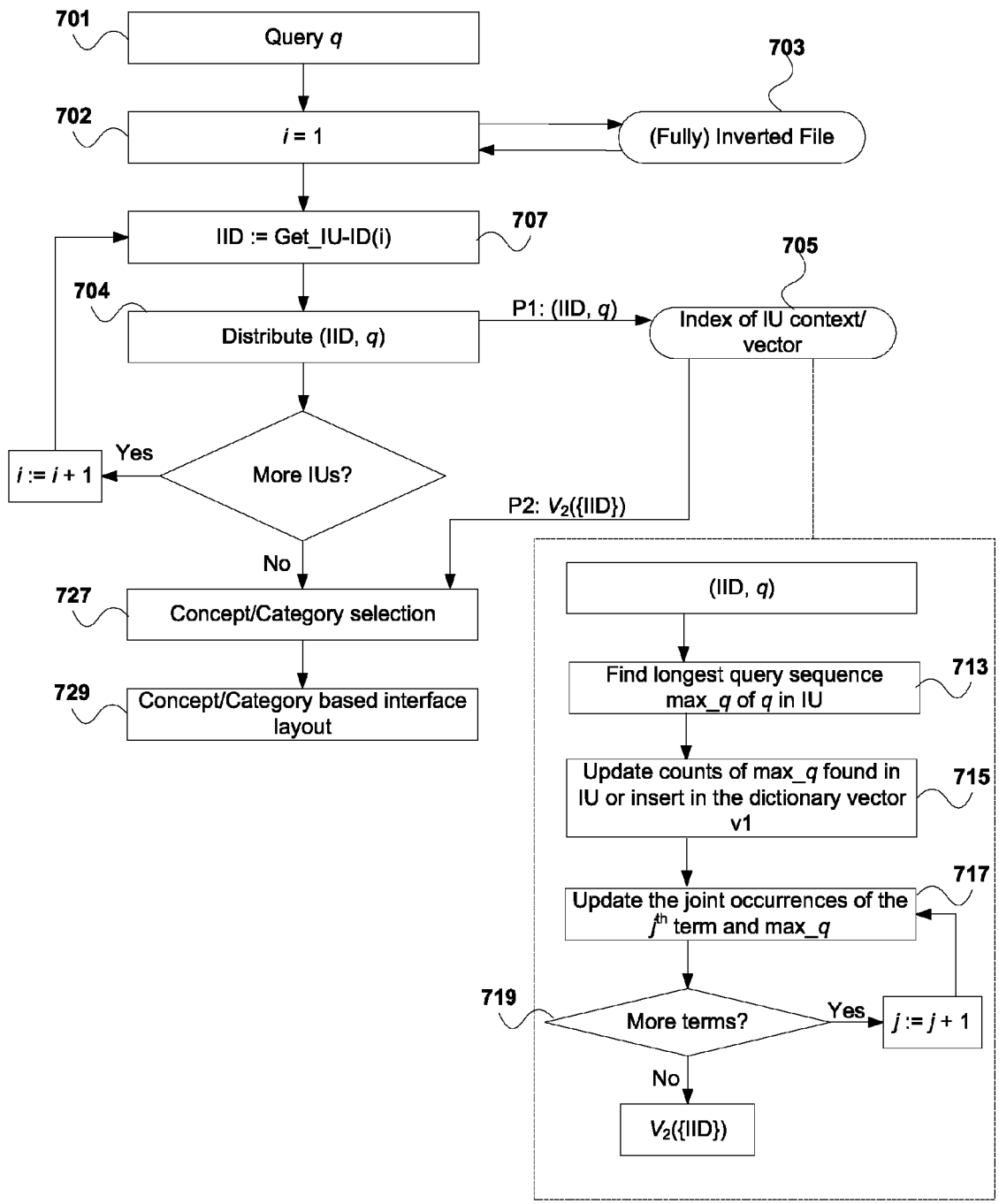
FIG. 7 is a process flow diagram of statistics computation to support a concept-based interface where the forward index is implemented by a PC-cluster.

Referring to FIG. 7, a simplified cluster-based dual indices structure to support concept-based search result interface is depicted.

For parallel processing, i:=1 moves to getting the information unit, and the processing from finding the longest query sequence to more terms are installed in each server. Getting the information unit simply distributes the IIDs of say the top 1000 information units to the different servers in the index of information unit according the IID value. Each server accesses the forward index, and executes the processes from finding the longest query sequence to more terms in parallel. The quantities of occurrences of query terms or near-by context terms are calculated and consolidated into a vector $V_2(\{IID\})$, and they are passed back to concepts/category selection to be aggregated together.

Figure 8:
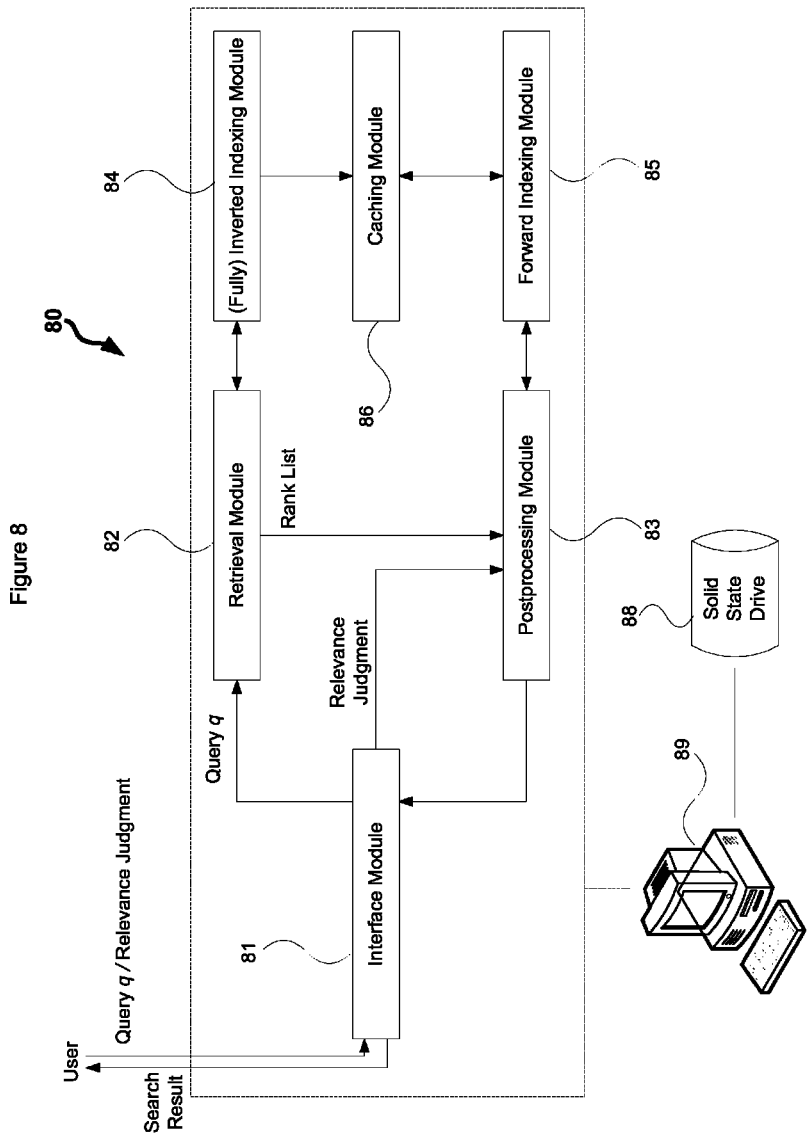
FIG. 8 is a block diagram of a retrieval system using dual indices to support query expansion, blind/relevance feedback and category/concept computation for search result organization.

Referring to FIG. 8, a retrieval system 80 using dual indices to support query expansion, blind/relevance feedback and category/concept computation for search result organization is depicted. The interface module 81 enables user interaction with the system 80 including passing the query q to the retrieval module 82, and passing the relevance judgments to the post-processing module 83 when the system 80 is operating with relevance feedback. The retrieval module 82 accesses the fully inverted indexing module 84 to generate the rank list. The rank list is passed to the post-processing module 83. The post-processing module 83 accesses the forward indexing module 85 for query expansion, building relevance/non-relevance models, re-ranking documents referenced in the rank list and computing scores of the category/concepts for search result organization. The post-processing module 83 returns the search results to the user via the interface module 81. The modules 81, 82, 83, 84, 85 are provided on a computing device 89. This computing device 89 may be a computer cluster of many computing nodes or this device 89 may be several clusters of computing nodes, where each cluster is dedicated to one or more specific functions of the components 81, 82, 83, 84, 85.

In one embodiment, a caching module 86 is provided to cache the word locations of the query terms. The cache becomes a file and may be stored in the solid state disk 88. Pointers are stored in the inverted index and separately in the forward index. These pointers are stored in the extended postings of the fully inverted files. Such extended postings have the following program structure:

```
struct ex_posting {
    integer IU_id; // identifier of the information unit
    integer term_frequency; // term frequency
    integer location_pointer;
// a pointer to a set of locations of the term in the IU referenced by IU_id
} extended_posting;
```

The storage allocated to store the location_pointer field of the struct ex_posting is the pointer storage.

When the term_frequency in struct ex_posting is more than one, then location_pointer points to the cache or file that contains the list of IU locations that the query term occurred.

In FIG. 9, the location_pointer is the double headed arrow between the inverted index 84 and the word_location or between the forward index 85 and the word_location.

The variable term_frequency is always larger than zero. If it is one, then the location_pointer will store the only location of the term in the IU referenced by IU_id. The data in the extended posting may be compressed. The location_pointer stores the only IU location of the query term in that IU.

During retrieval, the retrieval module 82 determines the rank list with the top X information units (IUs) where X is typically much larger than the top N IUs examined for blind/relevance feedback. Before the rank list is passed to the post-processing module 83, the location pointers (or directly the location information of the query term for the corresponding IUs) are inserted into the caching module 86 so that the postprocessing module 83 can make use of the cached location_pointers or their corresponding sets of locations that the query term occurred in the IUs. For IUs to be contexts, the forward indexing module 85 needs the location of query terms plus the IU_ids from the rank list in order to fetch the vectors of terms in such contexts.

The prior art method using re-ranking takes about 48 seconds for 3000 IUs using a dedicated computer assuming that the time scale is linear with the number of IUs re-ranked. If the signature method of the present invention takes 1 second, then the speed improvement is 48 times. In practical use, the speed improvement should be 5 to 10 times faster.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

I claim:

1. A method for using dual indices to support query expansion, relevance models, non-relevance models and an intelligent search interface, comprising using a computing device to:
   access an inverted index to obtain an initial retrieval of results in response to a query, and to generate a rank list of the results, the results referring to information units (IUs) where terms of the query occur;
   determine a number of "N" IUs in the results that are regarded by the computing device as relevant by accessing a forward index;
   determine at least one non-relevant IU in the results that are regarded by the computing device as not relevant by accessing the forward index; and
   using the forward index to perform any one from the group consisting of: computing query expansion weights, building the relevance models by the contexts of query terms in a top "N" retrieved IUs within the number of "N" IUs, building the non-relevance models using the at least one non-relevant IU, and finding the longest contiguous sequences of query terms in the query found in an IU;
   wherein the forward index and inverted index have pointers to locations in the IUs where terms of the query occur more than once, and a forward index and inverted index pointer storage stores the locations in the IUs where the query term occurs only once in the IUs, and the forward index retrieves a term frequency vector of the IU or a set of contexts of the IU; and
   wherein computing query expansion weights for the top "N" retrieved IUs utilizes the forward index to compute query expansion by:

computing at least one relevance query expansion term weight using the top "N" retrieved IUs in the results and the forward index;

computing at least one non-relevance query expansion term weight using the at least one non-relevant IU in the results and the forward index; and selecting query expansion terms using the results, the at least one relevance query expansion term weight, and the at least one non-relevance query expansion term weight.

2. The method according to claim 1, wherein "N" is from 1 to 10000.

3. The method according to claim 1, wherein "N" is query-dependent, and the forward index is accessed one-by-one to determine the number "N".

4. The method according to claim 1, wherein the forward index is searched by an information unit identifier (IID) of the IU, and is searched by terms of the query, and the frequencies of the query terms are collected.

5. The method according to claim 1, wherein the forward index is a set of frequency vectors for the IUs.

6. The method according to claim 1, wherein the inverted index and forward index are compressed.

7. The method according to claim 1, wherein the locations are cached in a cache that becomes a file.

8. The method according to claim 7, wherein the cache, inverted index and forward index are stored on solid state disk drives.

9. The method according to claim 1, wherein the forward index is any one from the group consisting of: variable bit-block compression signature, superimposed coding signature, vocabulary index, trie, B-tree, heap B-tree, red-black tree, suffix arrays, suffix tree, PATRICIA trie, string B-tree, and DAWGs.

10. The method according to claim 4, further comprising the initial steps of:

storing the frequencies of the query terms in the forward index; and storing the pointers to word locations in the forward index.

11. A system for supporting query expansion, relevance models, non-relevance models and an intelligent search interface using dual indices, the system comprising:

a computing device comprising a retrieval module and a post-processing module;

wherein the retrieval module is configured to access an inverted index to obtain an initial retrieval of results in response to a query and to generate a rank list of the results, the results referring to information units (IUs) where the query occurs;

wherein the post-processing module is configured to:

determine a number of "N" IUs in the results that are regarded by the computing device as relevant by accessing a forward index;

determine at least one non-relevant IU in the results that are regarded by the computing device by accessing the forward index; and use the forward index to perform any one from the group consisting of: computing query expansion weights for a top "N" retrieved IUs within the number of "N" IUs, building the relevance models by the contexts of query terms in the top "N" retrieved IUs, building the non-relevance models using the at least one non-relevant IU, and finding the longest contiguous sequences of query terms in the query found in an IU;

wherein the forward index and inverted index have pointers to locations in the IUs where terms of the query occur more than once, and a forward index and inverted index pointer storage stores the locations in the IUs where the query term occurs only once in the IUs, and the forward index retrieves a term frequency vector of the IU or a set of contexts of the IU; and wherein the post-processing module is configured to compute query expansion weights for the top "N" retrieved IUs utilizes the forward index to compute query expansion terms by:

computing at least one relevance query expansion term weight using the top "N" retrieved IUs in the results and the forward index;

computing at least one non-relevance query expansion term weight using the at least one non-relevant IU in the results and the forward index; and selecting query expansion terms using the results, the at least one relevance query expansion term weight, and the at least one non-relevance query expansion term weight.

12. The system according to claim 11, further comprising solid state disk drives to store the inverted index and forward index.

13. A search engine providing support for query expansion, relevance models, non-relevance models and an intelligent search interface, the search engine comprising:

a computing device comprising a retrieval module and a post-processing module;

dual indices consisting of an inverted index and a forward index;

wherein the retrieval module is configured to access an inverted index to obtain an initial retrieval of results in response to a query, and to generate a rank list of the results, the results referring to information units (IUs) where the query occurs;

wherein the post-processing module is configured to determine a number of "N" IUs in the results that are regarded by the computing device as relevant by accessing a forward index, determine at least one non-relevant IU in the results that are regarded by the computing device as not relevant by accessing the forward index, and the post-processing module uses the forward index to perform any one from the group consisting of: computing query expansion weights for top "N" retrieved IUs, building the relevance models by the contexts of query terms in the top "N" retrieved IUs, building the non-relevance models using the at least one non-relevant IU, and finding the longest contiguous sequences of query terms in the query found in an IU;

wherein the forward index and inverted index have pointers to locations in the IUs where terms of the query occur more than once, and a forward index and inverted index pointer storage stores the locations in the IUs where the query term occurs only once in the IUs, and the forward index retrieves a term frequency vector of the IU or a set of contexts of the IU; and wherein computing query expansion weights for a portion of the number of "N" IUs in the results utilizing the forward index to compute query expansion terms by:

computing at least one relevance query expansion term weight using the portion of the number of "N" IUs in the results and the forward index;

computing at least one non-relevance query expansion term weight using the at least one non-relevant IU in the results and the forward index; and selecting query expansion terms using the results, the at least one relevance query expansion term weight, and the at least one non-relevance query expansion term weight.

* * * * *